Figure 1:
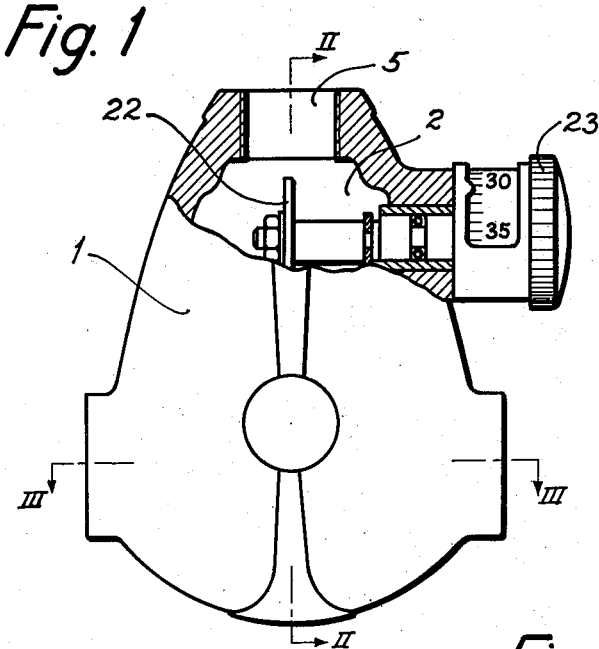

Dec. 31, 1963    K. PORLAND    3,116,015
MIXING VALVE FOR HOT AND COLD WATER INSTALLATIONS
Filed Sept. 30, 1958    4 Sheets-Sheet 1

Dec. 31, 1963  K. PORLAND  3,116,015
MIXING VALVE FOR HOT AND COLD WATER INSTALLATIONS
Filed Sept. 30, 1958  4 Sheets-Sheet 2
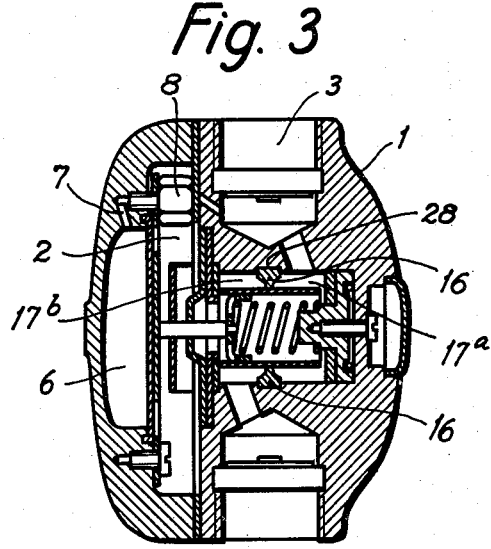
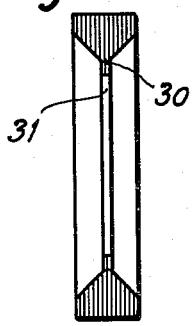
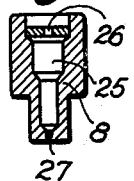
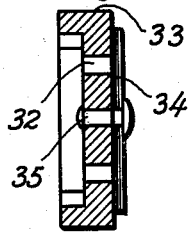
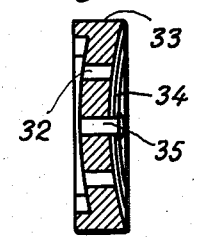
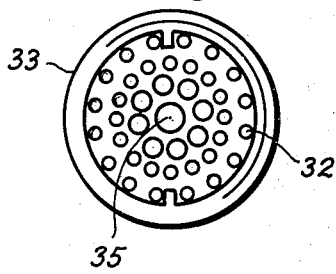
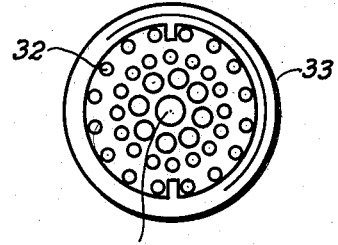

Dec. 31, 1963   K. PORLAND   3,116,015
MIXING VALVE FOR HOT AND COLD WATER INSTALLATIONS
Filed Sept. 30, 1958   4 Sheets-Sheet 3

Dec. 31, 1963     K. PORLAND     3,116,015
MIXING VALVE FOR HOT AND COLD WATER INSTALLATIONS
Filed Sept. 30, 1958     4 Sheets-Sheet 4

United States Patent Office

3,116,015
Patented Dec. 31, 1963

3,116,015
MIXING VALVE FOR HOT AND COLD WATER
INSTALLATIONS
Kjeld Porland, Elsmark, Nordborg, Als, Denmark, assignor to Danfoss ved ingenior Mads Clausen, Elsmark, Nordborg, Als, Denmark, a Danish firm
Filed Sept. 30, 1958, Ser. No. 764,365
13 Claims. (Cl. 236—12)

This invention relates to a mixing valve for hot and cold water installations and of the kind in which hot and cold water is fed to a mixing chamber, each through its separate pipe system, in a proportion determined by a spring-loaded pilot valve which is controlled by a resilient diaphragm inserted between the mixing chamber and a pressure chamber which communicates with one pipe system through an inlet and an outlet passage, the outlet passage, which leads to the mixing chamber, being provided with a thermostatically operated valve the bimetallic control member of which is disposed in the mixing chamber.

Mixing valves of the aforesaid kind are known, but they suffer, for example, from the drawback that the movable piston of the valve, in order to be balanced against the water pressure, has either to cooperate with more than two valve seats or to have sealing surfaces sliding in contact with each other, in which case relatively heavy shearing forces are required to counteract the friction between the surfaces. Furthermore, the piston and the valve seats are apt to receive a coating of calcareous deposits, more particularly, such parts of the valve that form part of the hot water system. As a result, irregularities in the calcareous deposits may prevent the mixing valve from sealing effectively and it may be difficult promptly to adjust and find a desired temperature independent of water pressure and temperature in the pipe systems connected to the valve.

It is the object of the present invention to provide a mixing valve of the aforesaid kind in which the said drawbacks are eliminated and which is furthermore of relatively simple design and therefore can be manufactured at a reasonable cost and is very reliable in operation.

An essential feature of the mixing valve according to the invention is a hollow cylinder in direction communication with the mixing chamber and mounted axially displaceable in a space which is provided inside the valve casing and is divided into two parts, the said cylinder being guided by a partition provided in the said space between the cold and the hot water pipe systems. Furthermore, the end edge sections of the cylinder are adapted to cooperate with valve seats mounted in the casing in endways position in relation to the cylinder which valve seats in combination with the said end edge sections bound annular feed openings for the cold and the hot water.

The result obtained is that the valve cylinder is relieved of the water pressure in the cold and the hot water systems alike and that the cylinder is but of comparatively small mass and therefore is easily moved even by slight pressure variations in the pressure chamber due to variations in the area of the discharge opening of the outlet passage. This will cause prompt and uniform reaction by the mixing valve and experience has shown that the endways positioned valve seats and the end edge sections of the cylinder are not very liable to be coated by calcareous deposits, and a very efficient sealing is therefore obtained in the two extreme positions of the mixing valve.

In one embodiment of the mixing valve according to the invention a closing plate is provided opposite the discharge opening of the outlet passage and attached to the bimetallic control member at adjustable distance of the said opening.

The result obtained is that the area of the discharge opening of the outlet passage is highly dependent on the extent to which the closing plate has been displaced by the bimetallic control member.

In another embodiment of the valve according to the invention the bimetallic control member is attached to a laminated spring the fulcrum of which rests in contact with a rotatable eccentric, whereby the area of the discharge opening of the outlet passage may be adjusted manually in conformity with a desired temperature by turning the eccentric.

In a third embodiment of the valve according to the invention the opening of the outlet passage is formed in a regulating spindle adapted for axial displacement towards and away from the closing plate. The result obtained is that the area of the discharge opening of the outlet passage may be adjusted manually conforming to a desired temperature by turning of the regulating spindle.

In a fourth embodiment of the valve according to the invention the inlet passage is provided with an exchangeable throttle nozzle which, under difficult conditions with widely varying water pressures at which the valve body might tend to oscillate, affords the possibility of substituting the throttle nozzle by a special nozzle, which in one embodiment according to the invention is designed with at least one damping compartment. The result obtained hereby is that the pressure variations are equalised without the valve cylinder being caused to oscillate.

In a fifth embodiment according to the invention there is provided a coil spring inside the valve cylinder, one end of the said spring being attached inside the cylinder whereas its other end rests against the valve casing close to the feed opening leading to the cold water pipe system. The result obtained is that the valve cylinder is rapidly, owing to the spring pressure, passed towards the feed opening for the hot water so as to close the said opening in case the cold water supply should fail for some reason or other, thus protecting the user from being scalded by the hot water.

The partition provided in the valve casing to separate the cold and the hot water pipe systems consists in a sixth embodiment of the valve according to the invention of a seal ring inserted in the casing and resting liquid-tightly against the outer surface of the valve cylinder close to the radial centre plane of the cylinder. As a result, the valve cylinder may slide in the opening of the seal ring and perform a movement relative to the said seal ring when subjected to mechanical action by the diaphragm for displacement in the seal ring.

In a seventh embodiment according to the invention the seal ring is of resilient material such as rubber, and as a result, small movements of the valve cylinder will only cause the seal ring edge lying in contact with the valve cylinder to bend flexibly in axial direction, so that actual sliding of the cylinder in the seal ring only occurs when larger movements are required. This reduces the wear on the inner edges of the seal ring and consequently gives improved durability and fewer replacements of the seal ring.

In order to further increase its axial resilient movability the seal ring has according to the invention a cross-section of the shape of a truncated cone having its base embedded in an annular groove provided in the casing and its top resting against the outer surface of the cylinder, whereby the friction between the seal ring and the outer surface of the valve cylinder becomes substantially less than if the seal ring were of rectangular cross-section. In a special embodiment according to the invention the seal ring is designed with an annular lip protruding from its inner edge and being of a smaller dimension in axial direction than the remaining part of the seal ring. The result obtained is that smaller displacements of the valve cylinder take place without sliding, but at a bending of the said lip.

The endways positioned valve seats are in a preferred embodiment of the valve according to the invention of metal plates whose surfaces opposite the valve cylinder are provided with a vulcanised rubber layer. As a consequence of this the valve cylinder will establish perfect sealing in its two extreme positions, since any unevennesses produced in the course of time in the end edge sections of the cylinder, for example by the flow of water or by calcareous deposits or solid particles being wedged between the said sections and the valve seat, are automatically equalised thereby that the said unevennesses penetrate into the resilient rubber layer.

The cross-sectional area of the throttle nozzle is in a preferred embodiment of the valve according to the invention less than the area of the discharge opening of the outlet passage so as to prevent any pressure from arising in the pressure chamber as long as the discharge opening of the outlet passage is open.

As there is frequently a pressure difference between the cold water and the hot water pipe systems, the mixing valve according to the invention is at the entrance to the divided space provided with non-return valves of such design that they prevent the cold and the hot water from flowing in a direction opposite their normal direction of flow. As a result, the water from the pipe system having the higher water pressure is prevented from entering the pipe system with the lower water pressure.

In accordance with the invention the non-return valves consist of a rigid valve plate having holes and being retained in the valve casing. The said plate covers the entrance to the divided space and on that side of the plate where the flow is received is provided a flexible valve disc which covers the holes and is made of a heat-resistant flexible material such as rubber. This design has been found simple and reliable in operation and not liable to breakdown on account of calcareous deposits. More particularly, it has been found convenient if, according to the invention, the valve plate is made of nylon, experience having shown that calcareous deposits do not occur to any extent worth mentioning on the smooth surface of this material.

The side of the valve plate where the flow is discharged is according to the invention preferably of concave shape. As a result, the flexible valve disc is forced very effectively against the valve plate by the water pressure, and in a preferred embodiment according to the invention the flexible disc is of flat or convex design in relation to the concave surface of the valve plate, being retained to the said surface of the valve plate by prestressing dependent on the shape of the disc, whereby the pressure exerted by the valve disc against the concave surface of the valve plate is further increased.

Mixing valves of the aforesaid kind may have the drawback that the temperature of the tepid mixed water is changed when the decreasing amount of water varies. If, for example, a smaller amount of mixed water is desired and, for example, a discharge valve for the shower is throttled, the pressure drop which is normally present in the feed openings between the valve cylinder and its endways positioned valve seats is moved to the said discharge valve whereby the pressure in the mixing chamber of the mixing valve is increased as a result of which the valve cylinder is displaced so that the cold water supply is increased whereby the mixing ratio is altered and the temperature of the mixed water falls.

In order to relieve this drawback one of the valve seats which are endways positioned in relation to the cylinder consists in an embodiment of the valve according to the invention of a spring-loaded diaphragm with a central opening providing communication to an otherwise closed space, the said diaphragm being spring-loaded in the direction towards the valve cylinder.

As a result, the diaphragm moves towards the valve cylinder, thus reducing the supply of cold water if the pressure of the tepid water rises, whereas the pressure exerted by the cold water is kept constant, and, conversely, the diaphragm moves away from the valve cylinder, thus increasing the supply of cold water if the pressure exerted by same increases, whereas the pressure exerted by the tepid water is kept constant.

In a special embodiment of the valve according to the invention the central opening of the diaphragm is reinforced along its edge by means of a mechanical rigid sleeve formed with a contact surface for a spring which urges the diaphragm into the said direction, whereby a secure guiding of the spring is obtained.

In one embodiment of the valve according to the invention the diaphragm is retained along its bent circumference in the divided space by means of a bowl, preferably of resilient material, and of such form that it furthermore secures the position of the diaphragm in relation to the valve cylinder, whereby sealing along the circumference of the diaphragm is obtained in a simple manner simultaneously with the diaphragm being prevented from displacement in axial direction, more particularly, away from the valve cylinder.

Figure 2:
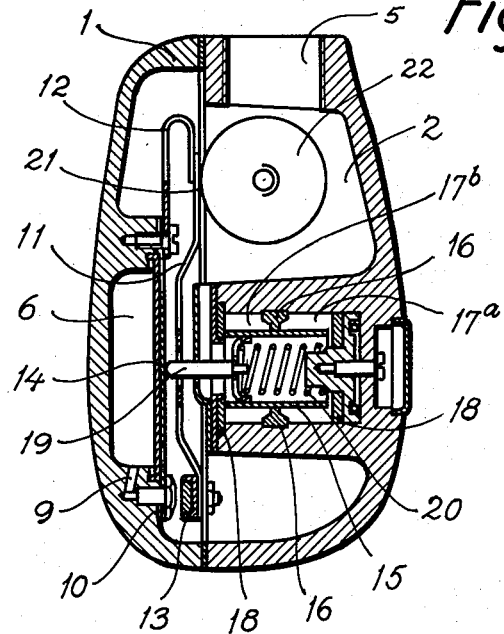
Figure 10:
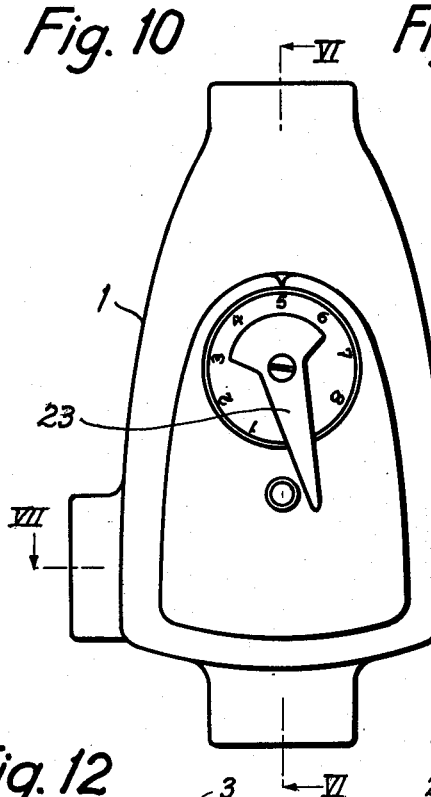
Figure 13:
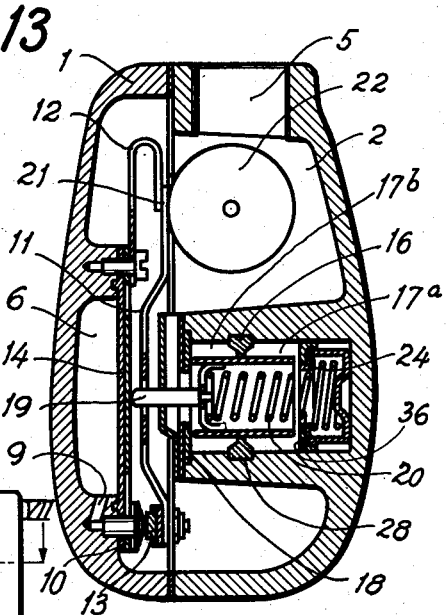
Figure 12:
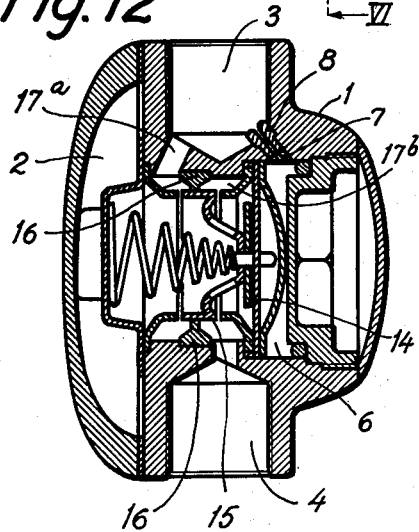
Figure 11:
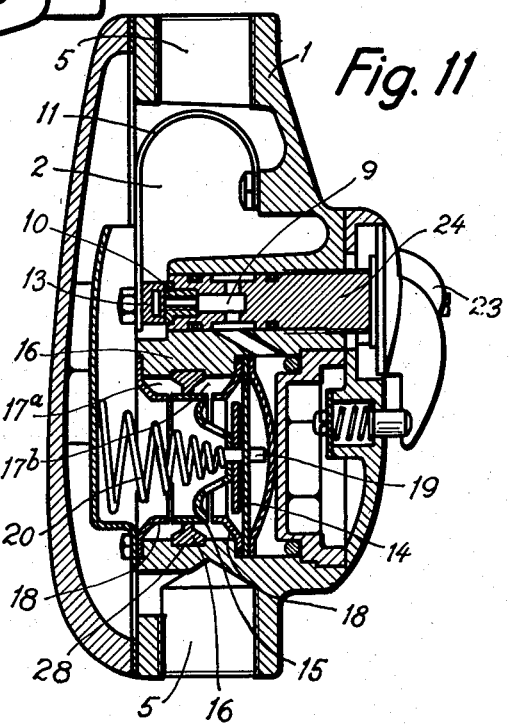
Figure 14:
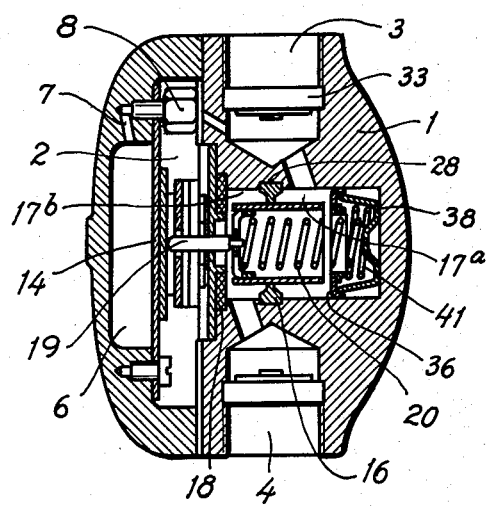
Figure 15:
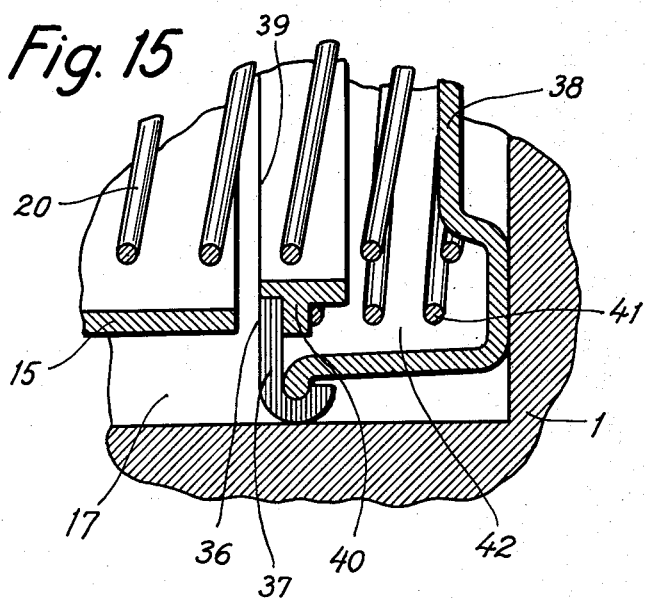

The invention will now be further described with reference to the drawing, in which FIGURE 1 is a front view, partly in section, of a mixing valve according to the invention, FIGURE 2 is the same, viewed on a section II—II of FIGURE 1, FIGURE 3 is the same, viewed on a section III—III of FIGURE 1, FIGURE 4 is a seal ring for same, viewed on a diametral section, FIGURE 5 is a throttle nozzle for same, viewed on a diametral section, FIGURES 6 and 7 shows an embodiment of a non-return valve for same, viewed in section and from the side, respectively, FIGURES 8 and 9 show another embodiment of a non-return valve for same, likewise in section and viewed from the side, FIGURE 10 is a front view of another embodiment of a mixing valve according to the invention, FIGURE 11 is the same on a section VI—VI of FIGURE 10, FIGURE 12 is the same on a section VII—VII of FIGURE 10, FIGURE 13 shows a mixing valve according to the invention, viewed in a section on the line II—II of FIGURE 1, FIGURE 14 is the same, viewed in a section on the line III—III of FIGURE 1, and FIGURE 15 is a part of FIGURE 13 on an enlarged scale.

The drawing shows a mixing valve consisting of a casing 1 which contains a mixing chamber 2 and an inlet opening 3 for connection of a valve for a cold water piping, another inlet opening 4 for connection of a hot water piping, and an outlet opening 5 for connection of a pipe leading to the point where the temperate water is to be used. Between the inlet opening 3 and the mixing chamber 2 is inserted a pressure chamber 6 which through an inlet passage 7 with an exchangeable throttle nozzle 8 is connected to the inlet opening 3 and through an outlet passage 9, in the discharge opening of which there is inserted a thermostatically operated pilot valve 10, is connected to the mixing chamber 2. The pilot valve 10 is controlled by a bimetallic control member 11 which is mounted in the mixing chamber 2 and consists of a laminated spring 12, one end of which is attached in the casing 1, whereas its other end is provided with a closing plate 13 cooperating with the discharge opening of the outlet passage 9 so as to regulate the flow leaving the pressure chamber 6 in accordance with the temperature of the mixed water. The bimetallic control member 11 is of such construction that a temperature rise of the mixed water causes the closing plate 13 to move away from the discharge opening, whereas a reduction of the said temperature causes the closing plate 13 to move closer to the discharge opening so as to reduce the flow discharged. The pressure chamber 6 and the mixing chamber are separated by a resilient diaphragm 14 which controls a spring-loaded valve inserted between the inlet openings 3, 4 and the mixing chamber 2 and consisting of a hollow valve cylinder 15 which is guided in a seal ring 16 and the inner space of which is in direct communication with the mixing chamber 2, the valve cylinder being displaceable in its axial direction in a space formed in the casing 1 and divided into two spaces 17a and 17b by the seal ring 16 which establishes liquid-tight sealing with the outer surface of the valve cylinder 15. The edge end sections of the cylinder 15 are adapted to cooperate with valve seats 18 mounted in the casing 1 in endways position in relation to the cylinder, which valve seats in combination with the said cylinder end edge sections bound annular feed openings for the cold and the hot water. By means of a pressure rod 19 the diaphragm 14 is connected to the valve cylinder 15 which is provided with a pressure spring 20 inside the cylinder to counteract the pressure exerted by the diaphragm 14. The one end of the said spring 20 is attached in the interior of the cylinder, its other end resting against the valve casing close to the feed opening leading to the cold water pipe system. When the water pressure in the pressure chamber 6 increases, for instance, because at falling temperature of the mixed water the control member 11 with the sealing plate 13 reduces the amount of flow through the pilot valve 10, or, if the water pressure in the cold water pipe system increases for some reason or other, the diaphragm 14 will displace the valve cylinder 15 overcoming the action of the spring 20, that is, forcing the said cylinder to the right in FIGURES 2 and 3 and in FIGURES 13 and 14 and to the left in FIGURES 11 and 12, so that the area of the feed opening for the cold water is reduced and the area of the feed opening for the hot water is increased, whereby the falling temperature of the mixed water or the increased water pressure of the cold water is counteracted by a reduced feed of cold water and an increased feed of hot water. In the embodiment of the mixing valve shown in FIGURES 1 to 3 and 13 to 14, the laminated spring 12 of the bimetallic control member 11 has a fulcrum 21 resting against a rotatable eccentric 22 which may be turned manually by means of a handle 23 so as to displace the fulcrum 21 and consequently the closing plate 13 in the direction towards or away from the discharge opening of the outlet passage 9, whereby the pilot valve 10 may be adjusted. In the embodiment of a mixing valve according to the invention as shown in FIGURES 10 to 12 a corresponding regulation of the pilot valve is obtained thereby that the discharge opening of the outlet passage 9 is formed in a regulating spindle 24 adapted to be axially displaced in the direction towards or away from the closing plate 13. The exchangeable throttle nozzle 8 disposed in the inlet passage 7 may be of the design disclosed in FIGURE 5 with at least one damping space 25 which through bores 26, 27 of smaller cross-sectional area than the cross-sectional area of the said space communicates with the inlet passage 7. The seal ring 16, which is embedded in an annular groove 28 of the casing 1, is of a resilient material such as rubber, its cross-sectional area being the shape of a truncated cone as shown in FIGURE 4, the base 29 of the cone being embedded in the groove 28, whereas its top 30 rests against the outer surface of the valve cylinder 12. The top 30 of the cone may be provided with an annular lip 31 protruding from the inner edge of the seal ring 16 and being of a smaller dimension axially than the remaining part of the seal ring. The endways disposed valve seats 18 consist preferably of metal plates the surface of which facing the valve cylinder is provided with a vulcanised layer of rubber. The cross-sectional area of the throttle nozzle 8 is preferably smaller than the area of the discharge opening of the outlet passage 9 in order to prevent the water pressure from being built up in the pressure chamber even though the discharge opening of the outlet passage 7 is entirely clear of the closing plate 13. In the inlet openings 3 and 4 for the cold and the hot water, respectively, non-return valves are mounted at the entrance to the spaces 17a, 17b in order to prevent water from one pipe system from being forced into the other pipe system when different water pressures arise in the two pipe systems. In accordance with the invention the non-return valve consists of a valve plate 33 having holes 32 and being retained in the valve casing by a threading or in other suitable manner. The said valve plate covers each of the inlets to the spaces 17a, 17b. On the side of the valve plate 33 where the flow is received is provided a flexible valve disc 34 of heat-resistant material such as rubber to cover the holes 32. The valve plate 33, which may be of any suitable material whatever, but preferably of nylon, may on the side on which the flow is received have a concave surface as shown in FIGURE 8, and the flexible disc 34 which is fastened to the valve plate 33, for example by means of a rivet 35, may be of flat or convex design in relation to the concave surface of the valve plate 33 and a retained by the rivet 35 against the said surface at a prestress dependent on the shape of the disc 34.

In the embodiment of the valve according to the invention as disclosed in FIGURES 13-15 the one valve seat 36 is constituted by a spring-loaded diaphragm 37 which is retained in the space 17a by a metal bowl 38. The said diaphragm 37 has a central opening 39 which may be lined with a sleeve 40 guiding a spring 41 which is inserted between the sleeve 40 and the bowl 38. The central opening 39 provides communication to an otherwise closed space 42 which is limited by the bowl 38, and the diaphragm 37 is kept tensioned in the direction of the valve cylinder 15 by the spring 41. The position of the diaphragm 37 in relation to the solid end bottom of the bowl depends not only on the pressure exerted by the spring 41 against the inner side of the diaphragm facing the space 42, but also by the pressure difference between the cold and the tepid water, so that the diaphragm 37 moves towards the valve cylinder 15, reducing the supply of cold water if the pressure exerted by the tepid water increases, while the pressure exerted by the cold water remains constant.

The operation of the embodiment of the valve according to the invention as disclosed in FIGURES 13-15 is as follows:

When mixed water is consumed, the bimetallic control member 11 keeps the closing plate 13 at the distance from the discharge opening for the pressure chamber 6 corresponding to the position of the handle 23 and the eccentric 22, and the pressure thereby arising in the pressure chamber causes the diaphragm 14 to displace the valve cylinder 15 to such a position in relation to its endways positioned valve seats 18, 36 that a suitable amount of cold and hot water is mixed so that the temperature of the mixed water will be that determined by the position of the handle. When the user desires a smaller amount of mixed water and, for example, throttles a regulating valve (not shown) mounted in series with a shower, the pressure in the mixing chamber 2 will increase, whereby the diaphragm 14 and consequently the valve cylinder 15 move to the left in FIGURES 2 and 3, so that the flow area of the feed opening for the cold water to the right in the said figures is increased, so that the mixed water would be of lower temperature. This is, however, counteracted by the aforesaid movement of the diaphragm 37 towards the valve cylinder 15, so that the flow area of the feed opening for the cold water, despite the altered pressure in the mixing chamber, is kept constant or even is reduced to compensate for the fact that the flow area of the feed opening for the hot water has been reduced by the movement of the valve cylinder 15 towards the left-hand side of the drawing. It will be obvious to those skilled in the art that a complete equalisation of the temperature changes for the mixed water at widely different amounts of this water can be obtained by a suitable selection of the areas of the diaphragm that are exposed to the pressure exerted by the cold and the hot water, respectively. If a very great range of equalisation is desired, the pressure exerted by the spring 41 against the diaphragm may be made adjustable.

What I claim and desire to secure by Letters Patent is:

1. In a mixing valve for hot and cold-water installations of the type having a casing containing a mixing chamber to which hot and cold water are fed through separate pipe systems in a proportion determined by a spring-loaded main valve defined by a hollow valve cylinder the interior of which is in direct communication with said mixing chamber and with said cylinder being mounted in axially-displaceable manner in a space defined in the casing which is divided into two parts by a partition between the cold-water pipe system and the hot-water pipe system, with valve seats disposed in endwise position in relation to said cylinder and the end edge sections of the cylinder being adapted to cooperate with said valve seats, whereby said valve seats in combination with said end edge sections define annular feed openings for the hot and the cold water, and said spring-loaded main valve is controlled by a resilient diaphragm disposed between and dividing the mixing chamber and a pressure chamber, the combination of means in said casing defining an inlet passage communicating with pipe systems supplying cold water and having an inlet opening in the pressure chamber, and means defining an outlet passage having an outlet opening leading to the mixing chamber, with said outlet passage being provided with a thermostatically-operated pilot valve having a bimetallic control member disposed in the mixing chamber, and means for adjusting the relationship between said bimetallic control member and said pilot valve, said adjusting means being a freely rotatable member, said casing defining said inlet passage and said outlet passage as integral parts thereof, whereby said inlet passage and said outlet passage are relatively short and are wholly confined in and formed by said casing and are wholly independent of said adjusting means, said cylinder having its spring-loading in the direction of closing of the feed opening for the hot water, and said inlet passage opening having a smaller cross-section than said outlet passage opening.

2. A valve as defined in claim 1, wherein the outlet passage has a discharge opening and opposite the discharge opening of the outlet passage there is provided a sealing plate attached ot the bimetallic control member at an adjustable distance from the opening.

3. A valve as defined in claim 1, wherein said bimetallic control member is carried by a leaf spring and wherein said adjusting means comprises a rotatable eccentric which rests against said leaf spring carrying the bimetallic control member.

4. A valve as defined in claim 1, wherein said bimetallic control member carries a sealing plate opposite said outlet opening of the outlet passage and wherein said outlet opening of the outlet passage is formed in a regulating spindle adapted for axial displacement towards and away from the sealing plate, said spindle forming said adjusting means.

5. A valve as defined in claim 1, wherein said inlet passage is provided with an exchangeable throttle nozzle for altering said cross section.

6. A valve as defined in claim 5, wherein said throttle nozzle has at least one damping space.

7. A valve as defined in claim 1, wherein said spring-loading of said cylinder is effected by a coil spring mounted inside said valve cylinder, one end of said spring being attached inside the cylinder and the other end resting against said casing close to the annular feed opening for the cold water.

8. A valve as defined in claim 7, wherein said annular feed opening for the cold water is defined between one end of said valve cylinder and a spring-loaded diaphragm with a central opening providing communication to an otherwise closed space, said diaphragm being spring-loaded in the direction towards said valve cylinder.

9. A valve as defined in claim 8, wherein said central opening of said diaphragm is reinforced along its edge by a rigid sleeve formed with a shoulder for a spring which urges said diaphragm into said direction.

10. A valve as defined in claim 1, wherein the partition provided in the valve casing between the cold and the hot water pipe systems consists of a seal ring embedded in the casing and resting liquid-tightly against the outer surface of the valve cylinder close to the radial center plane of the cylinder.

11. A valve as defined in claim 10, wherein the seal ring is formed from a resilient material.

12. A valve as defined in claim 10, wherein the casing is formed with an annular groove to receive said seal ring and the cross-section of the seal ring has the shape of a truncated cone having its base embedded in said annular groove and its top resting against the outer surface of said cylinder.

13. A valve as defined in claim 10, wherein the seal ring is formed with an annular lip protruding from its inner edge and of smaller dimension in axial direction than the remaining part of the seal ring.

References Cited in the file of this patent

UNITED STATES PATENTS

| | | |
|---|---|---|
| 1,113,426 | Galloway | Oct. 13, 1914 |
| 1,984,892 | Phillips et al. | Dec. 18, 1934 |
| 2,158,787 | Lorenz | May 16, 1939 |
| 2,517,056 | Trubert | Aug. 1, 1950 |
| 2,520,216 | Kounovsky | Aug. 29, 1950 |
| 2,550,907 | Brown | May 1, 1951 |
| 2,566,173 | Dillman | Aug. 28, 1951 |
| 2,599,569 | McLarty | June 10, 1952 |
| 2,647,692 | Keller | Aug. 4, 1953 |
| 2,651,468 | Joesting | Sept. 8, 1953 |
| 2,754,137 | Gine et al. | July 10, 1956 |
| 2,830,765 | Beller | Apr. 15, 1958 |

FOREIGN PATENTS

| | | |
|---|---|---|
| 720,112 | France | July 17, 1931 |